US012600081B2

(12) United States Patent (10) Patent No.: US 12,600,081 B2
Ambrosini et al. (45) Date of Patent: Apr. 14, 2026

(54) PROCESS FOR COATING A PREFORMED SUBSTRATE

(71) Applicant: PERSICO S.P.A., Nembro (IT)

(72) Inventors: Paolo Ambrosini, Nembro (IT); Valentino Del Carro, Nembro (IT)

(73) Assignee: PERSICO S.P.A., Nembro (IT)

( * ) Notice: Subject to any disclaimer, the term of this patent is extended or adjusted under 35 U.S.C. 154(b) by 91 days.

(21) Appl. No.: 18/567,511

(22) PCT Filed: May 23, 2022

(86) PCT No.: PCT/IT2022/050142
§ 371 (c)(1),
(2) Date: Dec. 6, 2023

(87) PCT Pub. No.: WO2022/259272
PCT Pub. Date: Dec. 15, 2022

(65) Prior Publication Data
US 2024/0262030 A1 Aug. 8, 2024

(30) Foreign Application Priority Data
Jun. 11, 2021 (IT) ........................ 102021000015293

(51) Int. Cl.
*B29C 63/16* (2006.01)
*B29C 63/00* (2006.01)
(52) U.S. Cl.
CPC .......... *B29C 63/16* (2013.01); *B29C 63/0017* (2013.01); *B29C 63/0065* (2013.01)
(58) Field of Classification Search
CPC ....... B29C 33/04; B29C 33/308; B29C 65/26; B29C 66/81459; B29C 66/81455;
(Continued)

(56) References Cited

U.S. PATENT DOCUMENTS 2,941,574 A * 6/1960 Stewart ................... B29C 53/04
156/443
2005/0012234 A1 1/2005 Kindig et al.
(Continued)

FOREIGN PATENT DOCUMENTS

DE 10048974 C2 * 11/2002 ............... B30B 5/02
EP 0410599 A2 1/1991
(Continued)

OTHER PUBLICATIONS

Machine translation of EP 3771546 date uknown.*
(Continued)

*Primary Examiner* — John L Goff, II
(74) *Attorney, Agent, or Firm* — FisherBroyles, LLP; Roger L. Browdy; Ronni S. Jillions

(57) ABSTRACT
Process for coating a preformed substrate (1), comprising providing a semi-finished product (2) comprising the preformed substrate (1) and a coating layer (3), providing a mould (4) comprising a first (5) and a second half-mould (6), the first half-mould (5) comprising an elastically deformable membrane (8) which at least partially forms a respective conformation surface (7), arranging the semi-finished product (2) on the second half-mould (6), putting under depression a fluid (11) acting on the membrane (8) to maintain the membrane (8) adherent to a main body (50) of the first half-mould, closing the mould (4) maintaining a free distance between the conformation surface (7) of the first half-mould (5) and the semi-finished product (2), pressurizing the fluid (11) to expand the membrane (8) towards the second half-mould (6) for compressing the semi-finished product, maintaining the membrane (8) in the second configuration, heating the semi¬finished product (2) for firmly fixing the preformed substrate (1) and the coating layer (3) to each other.

10 Claims, 4 Drawing Sheets

(58) Field of Classification Search
CPC ..... B29C 63/16; B29C 63/28; B29C 63/0091;
B29C 63/22; B29C 63/0065; B29C
63/0073; B29C 66/92611; B32B 37/1009
USPC ......................................................... 156/285
See application file for complete search history.

(56) References Cited

U.S. PATENT DOCUMENTS

| | | | | |
|---|---|---|---|---|
| 2009/0126872 A1* | 5/2009 | Sampica | ............ | B32B 37/1009 |
| | | | | 156/382 |
| 2009/0308542 A1 | 12/2009 | Baranton | | |
| 2010/0269979 A1 | 10/2010 | Abitz | | |
| 2015/0070743 A1* | 3/2015 | Branda | .................... | G02B 1/04 |
| | | | | 252/500 |
| 2016/0200015 A1* | 7/2016 | Barlag | .................... | B29C 43/18 |
| | | | | 425/112 |
| 2016/0338458 A1* | 11/2016 | Negrini | .................... | A45C 5/02 |

FOREIGN PATENT DOCUMENTS

| | | | | |
|---|---|---|---|---|
| EP | 3042747 A1 | 7/2016 | | |
| EP | 3738754 A1 | 11/2020 | | |
| EP | 3771546 A1 | 2/2021 | | |
| GB | 2139934 A | 11/1984 | | |
| WO | WO-0198060 A1 * | 12/2001 | ............ | B29C 63/04 |

OTHER PUBLICATIONS

Machine translation of DE 10048974 date uknown.*
Search Report for PCT/IT2022/050142 dated Sep. 16, 2022.
Written Opinion For PCT/IT2022/050142 dated Sep. 16, 2022.
European Office Action for 22732346.6, dated Jul. 23, 2025.

* cited by examiner

PROCESS FOR COATING A PREFORMED SUBSTRATE

TECHNICAL FIELD OF THE INVENTION

The present invention relates to a process for coating a preformed substrate, typically for producing a composite product for aesthetic use, for example for the interior trim parts of vehicles (e.g. dashboards, roof pavilions, door panels, etc.), boats, aircrafts, and/or furniture components.

STATE OF THE ART

For the production of composite products for aesthetic use, such as for example for the interior trim parts of vehicles, it is known coating a preformed substrate, i.e. previously formed (typically made of rigid plastic material), with at least one coating layer (made of a material having desired aesthetic properties, for example fabric, natural leather, synthetic leather, TPO, Alcantara™, etc.) by first making a semi-finished product, which comprises the coating layer and the substrate superimposed one on the other, and then making the substrate and the coating layer firmly adhere to each other by compression applied to the semi-finished product. The preformed substrate after the process for coating maintains the shape it initially had and the coating layer assumes the shape of the substrate.

Typically, such processes for coating provide the use of compression moulds having two half-moulds with respective conformation surfaces counter-shaped to the substrate (in order not to modify and/or damage the shape of the substrate).

SUMMARY OF THE INVENTION

The Applicant has observed that the aforesaid known processes for coating a preformed substrate have some drawbacks and/or can be improved under some aspects.

First of all, the Applicant has found that in order to make the coating layer adhere appropriately to the substrate it is advantageous that the compressive force applied by the mould to the semi-finished product is, at each point, directed substantially perpendicularly to the semi-finished product (for example to avoid sliding of, and/or creases in, the coating layer). The Applicant has also observed that, at portions of the substrate with complex geometry, such as undercuts and/or walls with substantially vertical development, obtaining the aforementioned direction of the compression force can be complex.

Furthermore, the Applicant has further ascertained that at such portions with complex geometry, damage to the semi-finished product may also occur during the closing of the mould.

For example, at walls of the semi-finished product with substantially vertical development, both of the aforementioned problems are typically connected to the vertical closure of the mould, which not only is unable to generate in these regions a compression force substantially perpendicular to the semi-finished product, but also, due to the contact between the moving half-mould and the semi-finished product, it provides a sliding of the half-mould on the substantially vertical walls of the semi-finished product, with the consequent risk of damage (e.g. tearing) and/or dragging (e.g. stretching) of the coating layer.

Furthermore, since the compression moulds typically used are structured to compress the semi-finished product with a given pressure along the whole surface of the semi-finished product by means of rigid metal half-moulds, it is necessary to provide coating layers and/or substrates that meet specific and narrow geometric tolerances, in particular in terms of thickness and/or shape.

For example, in the case of a coating layer with thickness having relatively high manufacturing tolerances (as can happen in case of natural leather coating), it may happen that the mould, compressing the semi-finished product with a given pressure, generates pressure concentrations at the portions of the coating layer having thickness greater than the remaining portions, causing imperfections of the finished product at such portions (such as for example more shiny and/or damaged regions), with consequent reprocessing or rejection of the finished product.

A not constant thickness of the coating layer, which can lead to the aforementioned problem, can also occur in presence of seams along the coating layer and/or of different materials sewn together or anyhow coupled.

In this second case it may be necessary to resort to more phases of the process for coating, each phase being aimed at the coating with one of the different materials, entailing a considerable lengthening of the cycle time (since for example the process parameters should be adjusted upstream of each individual process for coating).

The Applicant, in order to try to obtain a compression force as perpendicular to the semi-finished product as possible even in presence of portions with complex geometry, and at the same time limit the damage to the semi-finished product during the closing of the mould, has tried a solution in which portions of the conformation surface of one of the two half-moulds are made by means of one or more inserts which can slide along inclined planes with respect to the rest of the half-mould.

In a process for coating that uses such inserts, the mould is first closed with the semi-finished product interposed between the two half-moulds and with the inserts, arranged at the portions with complex geometry, in a retracted position in which they do not contact the semi-finished product (so that the mould can close without damaging the coating layer). Subsequently, the inserts, sliding along their respective inclined planes, are arranged in extracted position until the semi-finished product is compressed in cooperation with the other half-mould. In this way it is possible to realize a compression force with at least one component substantially perpendicular to the semi-finished product in presence of complex geometries.

However, the Applicant has found that, on the one hand, half-moulds with such sliding inserts are expensive to make and to operate and, on the other hand, they allow to cover only limited kinds of complex geometries (e.g. walls with partially vertical portions), resulting unsuitable for many other kinds of complex geometries that are increasingly widespread and requested.

Furthermore, since the conformation surface of such half-moulds is discontinuous at the edge of the sliding inserts, there is the risk of damaging the coating layer, compromising the aesthetic qualities of the finished product.

Furthermore, since the sliding inserts are made of rigid material, typically metal, and they are also structured to compress the semi-finished product with a given pressure, in the event of a variation of the thickness of the coating layer and/or of the substrate, such inserts can damage the final product.

The Applicant has therefore faced the problem of coating a preformed substrate with (at least) a coating layer in a simple, rapid, economical way, without penalizing the aesthetic qualities of the finished product and/or solving one or more of the aforementioned problems.

According to the Applicant, the above problem is solved by a process for coating according to the attached claims and/or having one or more of the following features. According to an aspect the invention relates to a process for coating a preformed substrate.

The process comprises:

providing a semi-finished product comprising said preformed substrate, a coating layer, and preferably an adhesive layer interposed between said preformed substrate and said coating layer;

providing a mould comprising a first and a second half-mould, each having a respective conformation surface, wherein the first half-mould comprises a main body and an elastically deformable membrane which at least partially forms the conformation surface of the first half-mould, and wherein (at least) the conformation surface of the second half-mould is substantially counter-shaped to said preformed substrate;

arranging said semi-finished product on the conformation surface of said second half-mould with said preformed substrate proximal to said second half-mould;

putting under depression a fluid acting on a first face of said membrane opposite to said second half-mould, to maintain said membrane in a first configuration in which it is adherent to said main body;

with said semi-finished product interposed between said conformation surfaces and said membrane in said first configuration, closing said mould while maintaining a free distance between said conformation surface of said first half-mould and said semi-finished product along a whole surface extension of said semi-finished product;

subsequently, pressurizing said fluid to arrange said membrane in a second configuration in which it is elastically expanded towards said second half-mould for compressing said semi-finished product between said membrane and said second half-mould;

maintaining said membrane in said second configuration, heating said semi-finished product for firmly fixing said preformed substrate and said coating layer to each other. According to the Applicant, with the membrane in the first configuration adherent to the main body of the first half-mould and the aforementioned free distance between the first half-mould and the semi-finished product, the mould can be closed by limiting or avoiding the contact between the first half-mould and the semi-finished product during the movement of one or both the half-moulds, and avoiding that the membrane, placing itself away from the first half-mould (e.g. hanging by gravity from the first half-mould), hinders the closure (e.g. accumulating during the closure and creating a thickness that interferes with the closure itself). In this way the risk of damaging the semi-finished product and/or the membrane during the closing of the mould is eliminated.

The membrane, elastically expanding after the closure, allows to obtain the aforesaid contact in a constructively simple and economical way. The use of a fluid also allows to obtain at each point a uniform thrust which acts on the semi-finished product through the membrane. The uniform thrust is advantageous since it reduces (up to potentially eliminating) the risk of creating regions in which, for example due to mechanical interference, the mould is unable to compress the semi-finished product with the desired pressure (and sufficient to obtain the coating).

Furthermore, thanks to the membrane, which can expand towards the second half-mould potentially along any direction, a compression force is obtained which acts on the semi-finished product substantially perpendicular to the semi-finished product at each point.

The elastically deformable membrane also allows to solve the aforementioned problem relating to the variation in thickness of the semi-finished product, regardless of whether such variation is due to the thickness tolerances of the coating layer, or to the presence of seams, or to the presence of different materials, or even to the presence of defects of the substrate. In fact, any variation in the nominal dimensions of the semi-finished product is compensated by the elasticity of the membrane, which, by elastically deforming, yields rather than compressing the semi-finished product differently from the moulds entirely made of metal (which have substantially zero elasticity compared to that of the processed materials). In this way the membrane is able to autonomously adapt to the shape/thickness variations of the semi-finished product, avoiding points of pressure accumulation (and therefore the aforementioned defects of the finished product).

In this way it is not necessary to intervene on the mould upstream of each single process for coating, for example by adjusting the operating parameters. It follows that with a single process for coating it is possible to process in series semi-finished products with different coating layers, as well as with coating layers comprising different materials and/or seams, reducing the cycle time with respect to the use of single-piece moulds and/or moulds with movable inserts and limiting, up to eliminating, the risk of damaging the portions of the coating layer having thickness different from the nominal thickness.

The present invention in one or more of the above aspects may exhibit one or more of the following preferred features.

Preferably in said first configuration said membrane is (substantially) counter-shaped to said preformed substrate (possibly with a scale factor to allow adhesion to the main body and closure of the mould while maintaining the aforementioned free distance). In this way the membrane (substantially) follows the surface shape of the semi-finished product along the whole surface extension of the semi-finished product, also reproducing its complex geometries, such as for example the walls with vertical development and/or the undercuts (e.g. arranging itself parallel to the vertical walls, and/or inserting itself, without contact, into the cavities of the semi-finished product). In this way the membrane undergoes a relatively low deformation in the passage between the first and the second configuration, thus limiting the respective degree of extension and therefore the harmful consequences of possible hysteresis phenomena in the contraction-expansion cycle of the membrane (ultimately extending the useful life of the membrane). Furthermore, the directing of the compression force substantially perpendicularly to the semi-finished product is further improved, since the counter-shaped membrane, expanding, contacts the semi-finished product in a uniform way (e.g. by limiting or eliminating any points of early contact with the semi-finished product that can stretch and/or move and/or tear the coating layer with the progressive expansion of the membrane). It is observed that the membrane does not need to faithfully follow the shape of the substrate, as it may be sufficient for the membrane to reproduce the main geometric characteristics of the substrate (e.g. ridges, valleys, complex geometries), neglecting its details, such as ribs and/or grooves with height of the order of the millimetres up to a few centimetres.

Preferably said membrane is firmly fixed to said main body, more preferably externally to the conformation surface of the first half-mould (e.g. along external vertical walls of the main body). In this way the membrane can freely expand at the whole conformation surface.

Preferably said membrane entirely forms said conformation surface of the first half-mould. In this way the first half-mould is constructively simple.

Preferably said membrane has a constant thickness along a respective whole surface extension. In this way the homogeneous expansion of the membrane is facilitated.

In one embodiment said membrane has a variable thickness along the respective whole surface extension, more preferably with thickening at said first face (in order not to leave marks on the finished product). The variable thickness allows to vary the degree of deformability of the membrane for a given pressure applied to the first face, making it more deformable at the points with less thickness (and vice versa). The lower deformability of the membrane can limit (or cancel) the pressure exerted by the membrane on the coating layer at portions of the substrate that must not be coated (e.g. because they are intended for other purposes) so that the coating layer does not adhere to the substrate.

Preferably said membrane is made of plastic material, more preferably silicone. In this way it is economical and resistant to the cycles.

In one embodiment said first half-mould comprises one or more further membranes each forming a respective portion of the conformation surface of the first half-mould.

In this way the membrane is used only where necessary (e.g. only for the portions with complex geometry of the semi-finished product), without decreasing the toughness of the half-mould.

Preferably each further membrane has one or more, more preferably all, of the features of said membrane. In this way the mould is simple to make and/or the membranes have features that are uniform to each other.

Preferably said main body comprises (at least) a cavity in communication with said membrane and containing said fluid (in the case of further membranes the main body comprises at least one respective cavity for each further membrane, each respective cavity containing said fluid, the respective cavities being in communication to each other or not). In this way the first half-mould is structurally compact.

Preferably said main body comprises an abutment surface facing said first face of the membrane. Preferably said cavity comprises (at least) a mouth arranged at said abutment surface. Preferably said abutment surface is (substantially) counter-shaped to (part of) said preformed substrate. Preferably said membrane in said first configuration is kept in contact with said abutment surface of the main body (i.e. the first face of the membrane contacts the abutment surface). In this way the abutment surface, with exception of the region where the mouth of the cavity is located, provides a rigid support to the membrane when adherent to the main body (i.e. in the first configuration), supporting the membrane and facilitating the maintenance by the membrane of the shape counter-shaped to the substrate. In this way the deformation of the membrane is limited, for example by limiting the possible introflection of the membrane towards the main body, which is possibly confined only at the mouth, and the useful life of the membrane is further extended.

Preferably said mould comprises an adjustment system of mass and/or pressure of said fluid (e.g. piston, hydraulic pump, volumetric pump, etc.). Optionally said adjustment system of pressure of the fluid can be controlled by proportional valves.

Preferably putting under depression and/or pressurizing said fluid is performed by means of said adjustment system of mass and/or pressure.

Preferably compressing said semi-finished product comprises exerting by said fluid a pressure greater than or equal to about 0.5 bar, and/or less than or equal to about 3 bar (more preferably equal to about 1 bar). In this way the maximum pressure of the fluid is limited and the construction of the mould is simplified (which does not have to withstand high pressures).

Preferably heating said semi-finished product comprises bringing said semi-finished product to a temperature greater than or equal to 40° C., more preferably greater than or equal to 50° C., even more preferably greater than or equal to 60° C., and/or less than or equal to 190° C., more preferably less than or equal to 180°C, even more preferably less than or equal to 170° C. These temperatures are sufficient to perform the process for coating.

Preferably heating said semi-finished product comprises transferring heat from the fluid (e.g. thermoset) to the semi-finished product through said membrane. In this way the structure of the mould is simple and rational, as the same fluid is used for both the mechanical and thermal action.

Preferably said fluid is a liquid or a gel. Preferably said fluid is selected among the following group: water, diathermic oil, water solutions, diathermic oil solutions. In this way the control of the pressure acting on the membrane is facilitated with respect to the gaseous fluids. Furthermore, the heat transfer between fluid and membrane is facilitated (globally enhancing the heat transfer between fluid and semi-finished product).

Preferably said adhesive layer comprises a heat sensitive adhesive. In this way heating the semi-finished product activates the adhesive which contributes to the mutual fixing between substrate and coating layer.

Preferably said preformed substrate comprises, more preferably it is made of, polymeric material, more preferably rigid. Preferably the preformed substrate is selected from the following group: polyurethane (PU), polyvinyl chloride (PVC), polystyrene, natural fibre, polyethylene terephthalate (PET), polypropylene (PP).

In one embodiment said preformed substrate can be made of metal or wood. The process according to the present invention allows coating substrates having mechanical and surface properties very different to each other.

Preferably said preformed substrate is in single piece.

Alternatively, the preformed substrate can comprise different materials firmly coupled to each other (for example polymeric material with metal and/or spongy material inserts).

Preferably said coating layer is selected from the following group of materials: natural leather, synthetic leather (i.e. a material having aesthetic and/or tactile and/or mechanical properties that recall natural leather, including for example Alcantara™, Ultrasuede™, Feel Tek™), polyurethane (PU), polyvinyl chloride (PVC), thermoplastic olefins (TPO), fabric (non-woven, woven, knitted, needled) made of synthetic textile fibres (e.g. polyester, aramid, etc.) and/or made of natural textile fibres (e.g. cotton, wool, etc.).

In one embodiment said coating layer is in single piece (i.e. it does not comprise joints, such as for example seams, welds, gluing, and/or continuity solutions in general along a surface extension thereof) and made of a single material.

In one embodiment said coating layer comprises a plurality of patches (made of the same material or of different materials) sewn together. This is the typical case of coating layers of some types of materials, such as natural leather, synthetic leather (e.g. Feel Tek™, Alcantara™, Ultra-suede™), which are considered in the field as hardly form-able materials, especially in presence of some three-dimensional shapes (e.g. small radii of curvature) of the substrate (in this case the coating layer consists of the patches sewn together and has appropriate extension and it is equipped, even before the process for coating, with a three-dimensional shape that approaches the shape of the substrate).

Preferably said process comprises, subsequently to said heating said semi-finished product, putting under depression said fluid to bring said membrane back to said first configuration. In this way the subsequent opening of the mould without damaging the membrane is allowed.

Preferably said process comprises, subsequently to the phase described in the previous paragraph, opening said mould and extracting from said mould a finished product comprising said preformed substrate and said coating layer firmly fixed to each other. In this way process for coating is concluded.

DETAILED DESCRIPTION OF SOME EMBODIMENTS OF THE INVENTION

The features and the advantages of the present invention will be more apparent from the following detailed description of some embodiments, presented by way of non-limiting example of the present invention, with reference to the attached figures (possibly not to scale with respect to the shown elements).

In the following a process for coating a preformed substrate 1 according to the present invention is exemplarily described.

Exemplarily the process initially comprises providing a semi-finished product 2 comprising the preformed substrate 1, a coating layer 3, and an adhesive layer (not shown) interposed between the preformed substrate 1 and the coating layer 3.

Exemplarily the preformed substrate is in single piece and made of rigid polymeric material, for example polyurethane.

Exemplarily the substrate 1 has a three-dimensional shape which is typically imparted to the substrate before the process for coating, for example by means of a moulding process (not shown) of a raw material to form the substrate.

Figure 2:

The aforesaid shape of the substrate exemplarily comprises portions with complex geometry, such as for example a wall 60 and a recess with two oblique lateral walls 61, such walls 60, 61 having development with a component along the closing direction 100 (FIG. 2).

Exemplarily the coating layer 3 is made of natural leather and in single piece.

In other embodiments (not shown) the preformed substrate and/or the coating layer can comprise, or be made of, materials other than those just mentioned (for example selected from those previously described). Furthermore, the coating layer can also be made by means of a plurality of patches sewn together. The patches can, for example, be made of a single material, or of mutually different materials.

Exemplarily the adhesive layer comprises a heat sensitive adhesive. In one embodiment (not shown) the adhesive layer may comprise a pressure sensitive adhesive (e.g. alternatively or in addition to the aforementioned heat sensitive adhesive).

Exemplarily the adhesive layer is applied to the substrate and/or to the coating layer manually or by automated machinery (not shown). The adhesive layer can be applied only at some portions respectively of the substrate and/or of the coating layer, and/or following a pattern, such as for example by lines or by points (each having a given surface extension). Alternatively, the adhesive layer can be applied along a whole surface extension of respectively the substrate and/or the coating layer.

Furthermore, the adhesive layer can be applied uniformly or by providing areas with a greater quantity of adhesive (for example where stronger bonding is needed).

In one embodiment (not shown) the semi-finished product can further comprise a further layer made of elastically deformable material (e.g. open or closed cell polymeric foam) arranged between the substrate and the coating layer, preferably directly in contact with the coating layer, to give to the finished product a soft-touch property.

Exemplarily the process also comprises exemplarily providing a mould 4 (FIG. 1-3) comprising a first 5 and a second half-mould 6 each having a respective conformation surface 7.

Exemplarily the first half-mould 5 comprises a main body 50 and an elastically deformable membrane 8 which exemplarily entirely forms the conformation surface 7 of the first half-mould 5.

In one embodiment (not shown) the first half-mould can comprise one or more further membranes each forming a respective portion of the conformation surface of the first half-mould. Preferably each further membrane has one or more of the features of the membrane. In this embodiment the fluid acts on a respective first face of each further membrane opposite to the second half-mould.

Exemplarily the membrane 8 is made of silicone with constant thickness along its whole surface extension, in single piece, and it is firmly fixed to the main body 50 at external vertical walls 9 of the first half-mould.

In one embodiment (not shown) the membrane can have variable thickness along the respective whole surface extension, preferably with thickening at a face of the membrane facing the first half-mould (i.e. on the side of the membrane that does not contact the semi-finished product).

Exemplarily the main body 50 comprises a cavity 10 in communication with the membrane 8 and containing a fluid 11 acting on a first face 12 of the membrane 8 opposite to the second half-mould 6. Exemplarily the fluid 11 is water.

Exemplarily the main body 50 comprises an abutment surface 13 facing the first face 12 and the cavity 10 comprises a mouth 14 arranged at the abutment surface 13.

Exemplarily the abutment surface 13 is counter-shaped to part of the substrate 1.

Exemplarily the mould 4 comprises an adjusting system 15 of mass and/or pressure of the fluid 11, exemplarily comprising a piston 16 arranged inside the cavity 10.

Exemplarily said mould 4 also comprises a sealing element 17 (e.g. a gasket) operatively interposed between the piston 16 and the first half-mould 5.

Figure 1:
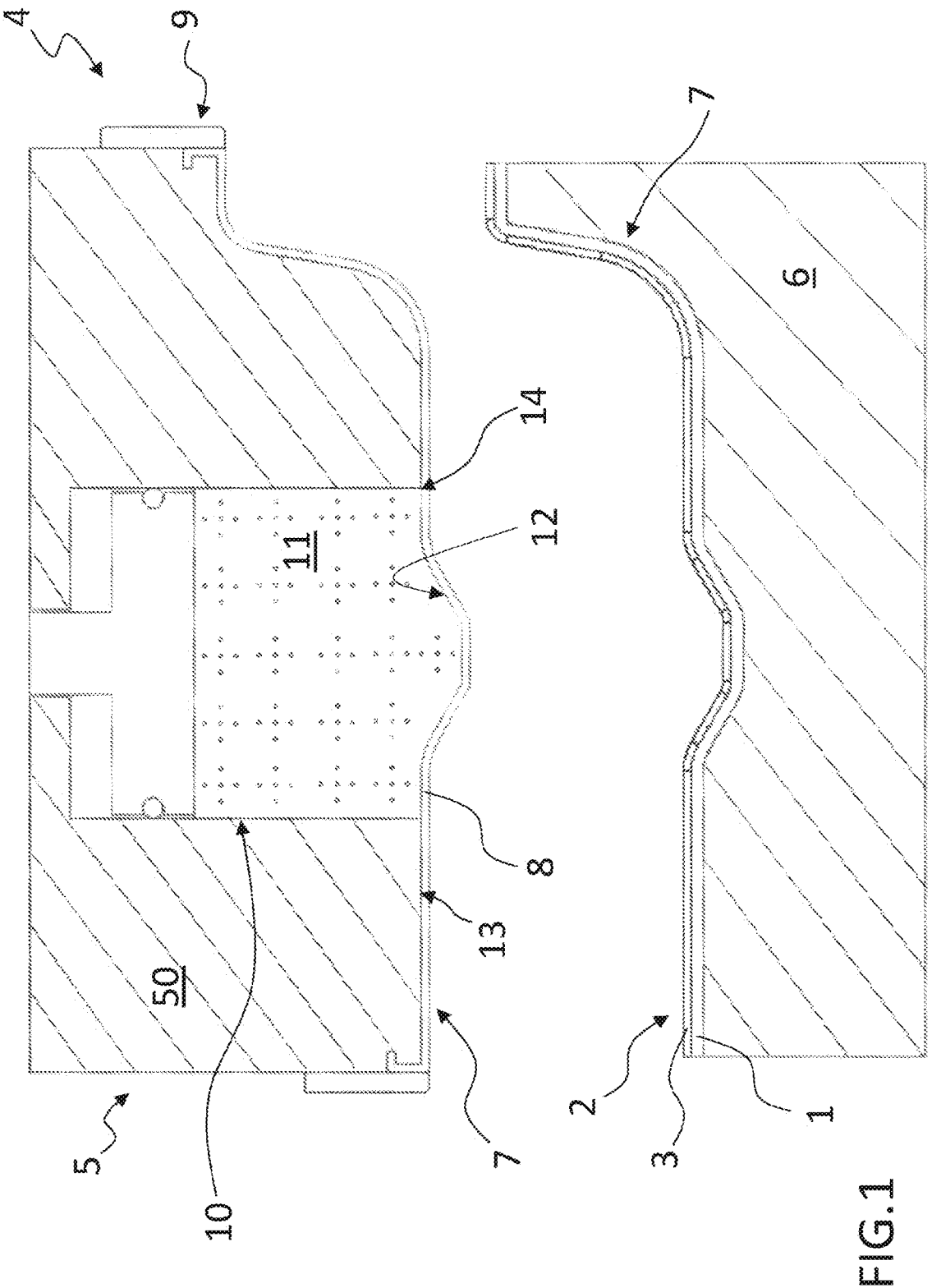
FIGS. 1 to 4 show in a purely schematic way some exemplary steps of a process for coating according to the present invention.

Exemplarily the process comprises arranging the semi-finished product 2 on the conformation surface 7 of the second half-mould 6 with the preformed substrate proximal to the second half-mould 6 (FIG. 1). The conformation surface 7, exemplarily counter-shaped to the preformed substrate 1, receives the semi-finished product by contacting the substrate at each point (i.e. without leaving empty portions below the substrate).

Exemplarily the process comprises putting under depression the fluid 11 to maintain the membrane 8 in a first configuration in which it is adherent to the main body 50 (FIG. 1), exemplarily kept in contact with the abutment surface 13 (the membrane is devoid of rigid support only at the mouth 14 of the cavity 10).

Exemplarily, in the first configuration, the membrane 8 is counter-shaped to the preformed substrate 1. Exemplarily the first configuration of the membrane is obtained by applying a depression to the fluid 11 such that the pressure acting on the first face 12 of the membrane (i.e. at the side of the fluid 11) and the atmospheric pressure acting on the opposite face are substantially equal to each other, possibly with a slight predominance of atmospheric pressure, to keep the membrane adherent to the main body without at the same time causing introflection of the membrane at the mouth 14 of the cavity 10 (i.e. so as to keep the membrane counter-shaped to the substrate as shown in FIGS. 1 and 2).

Exemplarily, with the semi-finished product 2 interposed between the conformation surfaces 7 and the membrane 8 in the first configuration, the process comprises closing the mould 4 maintaining a free distance between the conformation surface 7 of the first half-mould 5 and the semi-finished product 2 along a whole surface extension of the semi-finished product (FIG. 2). In other words, the mould is closed without the membrane touching the semi-finished product at any point.

Figure 3:
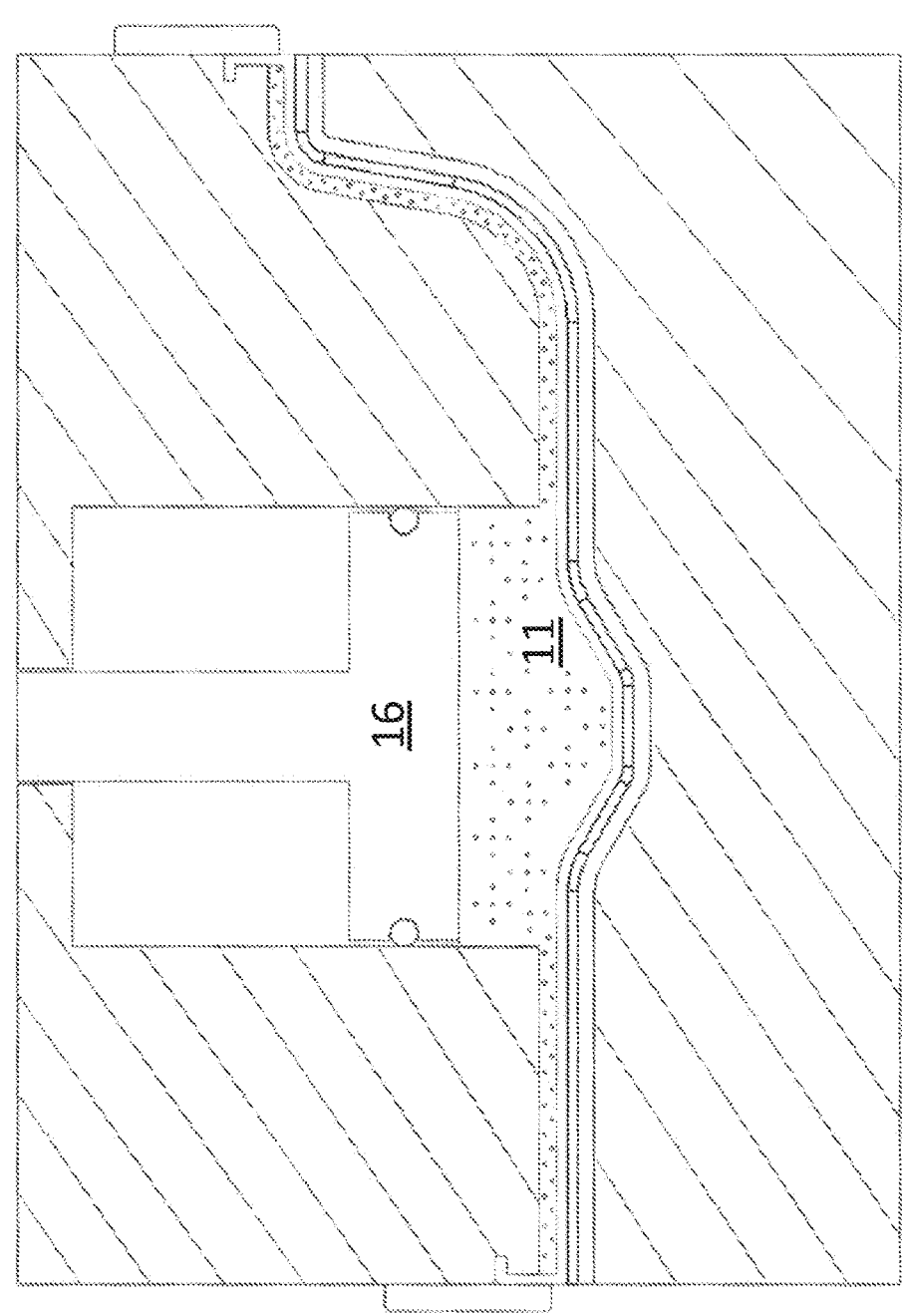

Exemplarily the process subsequently comprises pressurizing the fluid 11 to arrange the membrane 8 in a second configuration in which it is elastically expanded towards the second half-mould 6 for compressing the semi-finished product 2 between the membrane 8 and the second half-mould 6 (FIG. 3).

Exemplarily respectively putting under depression, and pressurizing, the fluid 11 is performed by means of the adjusting system 15 of mass and/or pressure. Exemplarily the piston 16 acts on the fluid 11 to vary its pressure.

Exemplarily compressing the semi-finished product comprises exerting by the fluid a pressure of about 1 bar.

Exemplarily, maintaining the membrane 8 in the second configuration, the process comprises heating the semi-finished product 2 for firmly fixing the preformed substrate 1 and the coating layer 3 to each other, also activating the heat-sensitive adhesive layer to further facilitate the fixing.

Exemplarily heating the semi-finished product 2 comprises bringing the semi-finished product to a temperature between 60° ° C. and 170° C. by transferring heat from the fluid 11 to the semi-finished product 2 through the membrane 8. Exemplarily the fluid 11 is kept at a (substantially) constant temperature (e.g. thermoset) for example by supplying heat to the fluid by means of electric resistances and/or a heat exchanger (not shown).

Exemplarily, (not shown), also the main body 50 of the first half-mould and the second half-mould 6 are kept at a respective (substantially) constant temperature (e.g. close to the temperature of the fluid, for example to limit the thermal shock).

Typically, it is provided adapting the kind of used fluid 11 as a function of the pressures and of the temperatures to which the fluid is subjected during the process, to avoid the phase transition, even if only partial, of the fluid (e.g. from liquid to gaseous in the form of vapor or two-phase liquid-vapor mixture) which would complicate the uniform control of the pressure in the cavity 10 and/or worsen the efficiency of heat transfer between the fluid and the membrane.

Figure 4:
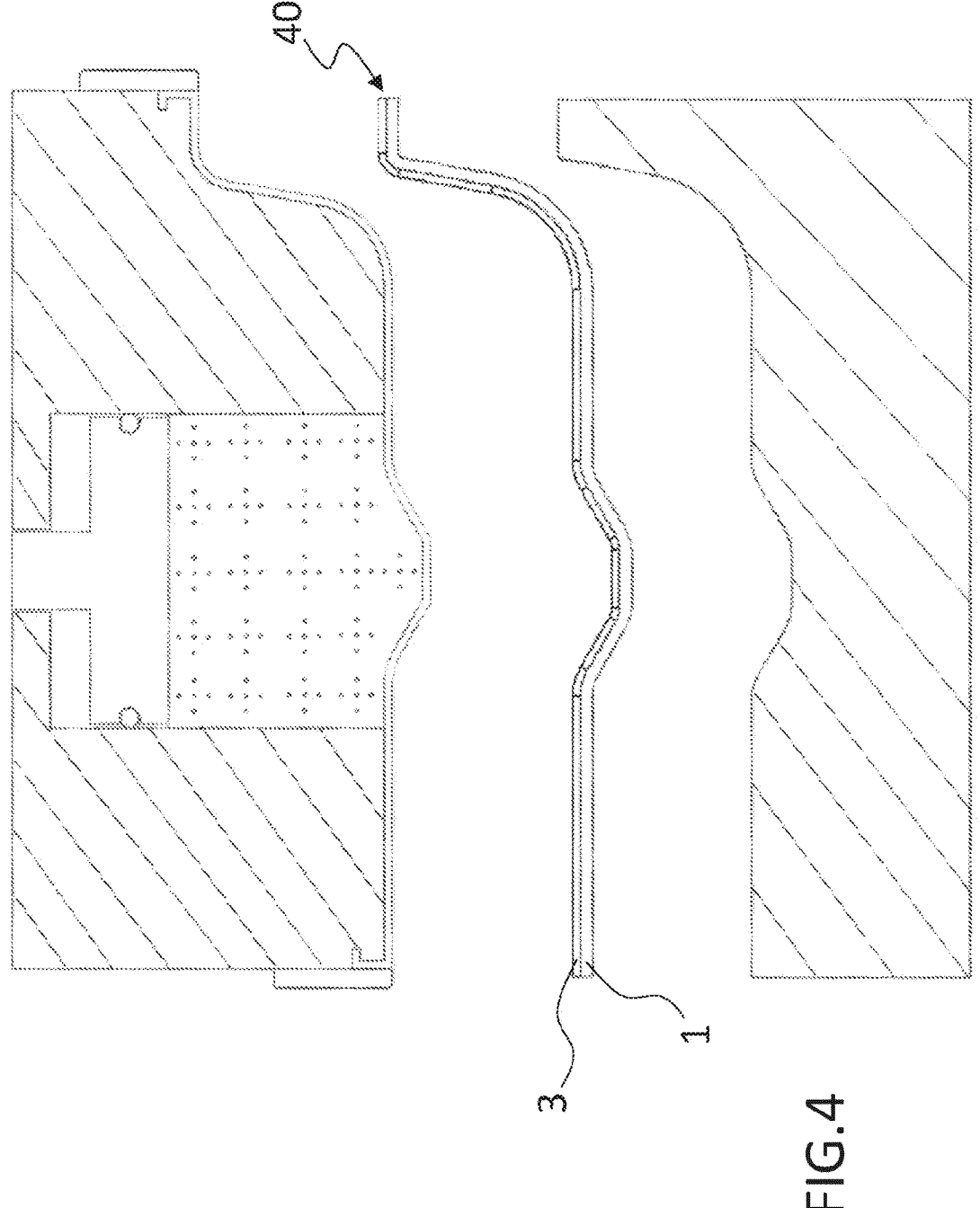

Exemplarily the process comprises (not shown), subsequently to heating the semi-finished product, putting under depression the fluid 11 to bring the membrane 8 back to the first configuration, and, subsequently, opening the mould and extracting, from the mould, a finished product 40 (FIG. 4) comprising the preformed substrate 1 and the coating layer 3 firmly fixed to each other. In this way the process for coating is concluded. As exemplarily shown, the preformed substrate after the process for coating maintains the shape it initially had and the coating layer adapts itself to the shape of the substrate.

The process for coating according to the present invention allows to coat in a simple and economical way preformed substrates also comprising complex geometries, such as for example the walls 60 and 61 of the substrate 1, without the use of sliding inserts and without the risk of damaging the semi-finished product.

In fact, exemplarily, along the whole surface extension of the semi-finished product (in particular at the walls 60 and 61), thanks to the free distance and to the membrane 8 in the first configuration, the first half-mould 5 does not contact the semi-finished product during the closing of the mould 4. Furthermore, thanks to the membrane 8 which can be pushed by the fluid 11 away from the main body 50 along any direction, exemplarily in synergy with the fact that the membrane is counter-shaped to the substrate 1, it is possible to exert on the semi-finished product a uniform compression force which is also perpendicular to the semi-finished product at any point.

The invention claimed is:

1. A process for coating a preformed substrate, the process comprising:

providing a semi-finished product comprising said preformed substrate, a coating layer, and an adhesive layer interposed between said preformed substrate and said coating layer;

providing a mould comprising a first and a second half-mould each having a respective conformation surface, wherein the first half-mould comprises a main body and an elastically deformable membrane which at least partially forms the conformation surface of the first half-mould, and wherein at least the conformation surface of the second half-mould is substantially counter-shaped to said preformed substrate;

arranging said semi-finished product on the conformation surface of said second half-mould with said preformed substrate proximal to said second half-mould;

putting under depression a fluid acting on a first face of said membrane opposite to said second half-mould by applying a depression to the fluid such that the pressure acting on the first face of the membrane and atmospheric pressure acting on an opposite face of the membrane are substantially equal to each other or such that the atmospheric pressure acting on the opposite face of the membrane is slight predominant with respect to the pressure acting on the first face of the membrane, to maintain said membrane in a first configuration in which it is adherent to said main body;

with said semi-finished product interposed between said conformation surfaces and said membrane in said first configuration, closing said mould while maintaining a free distance between said conformation surface of said first half-mould and said semi-finished product along a whole surface extension of said semi-finished product;

subsequently, pressurizing said fluid to arrange said membrane in a second configuration in which it is elastically expanded towards said second half-mould for compressing said semi-finished product between said membrane and said second half-mould;

maintaining said membrane in said second configuration, heating said semi-finished product for firmly fixing said preformed substrate and said coating layer to each other; and wherein the fluid is a liquid.

2. The process according to claim 1, wherein in said first configuration said membrane is substantially counter-shaped to said preformed substrate.

3. The process according to claim 1, wherein said membrane entirely forms said conformation surface of the first half-mould, wherein said membrane is made of plastic material and is firmly fixed to said main body, and wherein said membrane has a constant thickness or a thickness variable along a respective whole surface extension, with thickening at said first face.

4. The process according to claim 1, wherein said first half-mould comprises one or more further membranes each forming a respective portion of the conformation surface of the first half-mould, wherein said membrane and/or each further membrane are made of plastic material, are firmly fixed to said main body and have a constant thickness or a thickness variable along a respective whole surface extension.

5. The process according to claim 1, wherein said main body comprises a cavity in communication with said membrane and containing said fluid, wherein said main body comprises an abutment surface facing said first face of the membrane, wherein said cavity comprises a mouth arranged at said abutment surface, wherein said abutment surface is substantially counter-shaped to said preformed substrate, and wherein said membrane in said first configuration is kept in contact with said abutment surface of the main body.

6. The process according to claim 1, wherein compressing said semi-finished product comprises exerting by said fluid a pressure greater than or equal to about 0.5 bar, and less than or equal to about 3 bar.

7. The process according to claim 1, wherein heating said semi-finished product comprises bringing said semi-finished product to a temperature greater than or equal to 40° C., and less than or equal to 190° C.

8. The process according to claim 1, wherein heating said semi-finished product comprises transferring heat from the fluid to the semi-finished product through said membrane, and wherein the fluid is selected among the following group: water, diathermic oil, water solutions, diathermic oil solutions.

9. The process according to claim 1, wherein said adhesive layer comprises a heat sensitive adhesive, wherein said preformed substrate comprises a polymeric material, wherein the preformed substrate is selected from the following group: polyurethane, polyvinyl chloride, polystyrene, natural fibre, polyethylene terephthalate, polypropylene, wherein said coating layer is chosen from the following group of materials: natural leather, synthetic leather, polyurethane, polyvinyl chloride, thermoplastic olefins, non-woven fabric of synthetic textile fibres and/or of natural textile fibres, woven fabric of synthetic textile fibres and/or of natural textile fibres, knitted fabric of synthetic textile fibres and/or of natural textile fibres, needle punched fabric of synthetic textile fibres and/or of natural textile fibres, and wherein said coating layer is in single piece and made of a single material or it comprises a plurality of patches sewn together.

10. The process according to claim 1, comprising, subsequently to said heating said semi-finished product, putting under depression said fluid to bring said membrane back to said first configuration, and subsequently opening said mould and extracting from said mould a finished product comprising said preformed substrate and said coating layer firmly fixed to each other.

\* \* \* \* \*